(12) United States Patent
Bae et al.

(10) Patent No.: US 8,168,332 B2
(45) Date of Patent: May 1, 2012

(54) SEPARATOR HAVING POROUS COATING LAYER AND ELECTROCHEMICAL DEVICE CONTAINING THE SAME

(75) Inventors: Yoon-Jung Bae, Daejeon (KR); Pil-Kyu Park, Daejeon (KR); Jong-Hwan Kim, Daejeon (KR); Dong-Hun Han, Daejeon (KR); Han-Ho Lee, Daejeon (KR); Sang-Young Lee, Daejeon (KR); Ji-Sang Yu, Daejeon (KR); Hyun-Min Jang, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/745,717

(22) PCT Filed: Mar. 3, 2009
(Under 37 CFR 1.47)

(86) PCT No.: PCT/KR2009/001033
§ 371 (c)(1),
(2), (4) Date: Aug. 24, 2010

(87) PCT Pub. No.: WO2009/110726
PCT Pub. Date: Sep. 11, 2009

(65) Prior Publication Data
US 2011/0045338 A1 Feb. 24, 2011

(30) Foreign Application Priority Data
Mar. 4, 2008 (KR) .......................... 10-2008-0020206

(51) Int. Cl.
*H01M 2/16* (2006.01)
(52) U.S. Cl. ........ 429/251; 429/129; 429/142; 429/144; 429/248; 429/249

(58) Field of Classification Search ............ 429/129, 429/142, 248, 249, 251
See application file for complete search history.

(56) References Cited

U.S. PATENT DOCUMENTS
2002/0110732 A1    8/2002   Coustier et al.
(Continued)

FOREIGN PATENT DOCUMENTS
KR         20040005908         1/2004
(Continued)

OTHER PUBLICATIONS

International Search Report, PCT/KR2009/001033, dated Oct. 20, 2009.

*Primary Examiner* — Ula C Ruddock
*Assistant Examiner* — Heng Chan
(74) *Attorney, Agent, or Firm* — Lerner, David, Littenberg, Krumholz & Mentlik, LLP (57) ABSTRACT

A separator includes a porous substrate having a plurality of pores; and a porous coating layer formed on at least one surface of the porous substrate and made of a mixture of a plurality of inorganic particles and a binder polymer, wherein the binder polymer includes a first polyvinylidene fluoride based copolymer having solubility of 25 weight % or more with respect to acetone at 35° C.; a second polyvinylidene fluoride-based copolymer having solubility of 10 weight % or less with respect to acetone at 35° C.; and a polymer having a cyano group. This separator decelerates deterioration of life span of an electrochemical device, and prevents disintercalation of inorganic particles in the porous coating layer, thereby improving safety of the electrochemical device.

9 Claims, 2 Drawing Sheets

U.S. PATENT DOCUMENTS

| | | |
|---|---|---|
| 2005/0277026 A1* | 12/2005 | Nishikawa et al. ........... 429/249 |
| 2006/0131166 A1 | 6/2006 | LaConti et al. |
| 2008/0292968 A1 | 11/2008 | Lee et al. |
| 2009/0111026 A1 | 4/2009 | Kim et al. |

FOREIGN PATENT DOCUMENTS

| | | | |
|---|---|---|---|
| KR | 20070038645 A | | 4/2007 |
| KR | 100727247 B1 | * | 6/2007 |
| KR | 100727248 | * | 6/2007 |
| KR | 20070001011 U | | 9/2007 |
| WO | 02082565 A2 | | 10/2002 |
| WO | 2006135108 A1 | | 12/2006 |
| WO | WO 2008/097013 | * | 2/2008 |

* cited by examiner

SEPARATOR HAVING POROUS COATING LAYER AND ELECTROCHEMICAL DEVICE CONTAINING THE SAME

CROSS REFERENCE TO RELATED APPLICATIONS

The present application is a national phase entry under 35 U.S.C. §371 of International Application No. PCT/KR2009/001033, filed Mar. 3, 2009, published in English, which claims priority from Korean Patent Application No. 10-2008-0020206, filed Mar. 4, 2008. The disclosures of said applications are incorporated by reference herein.

TECHNICAL FIELD

The present invention relates to a separator used for an electrochemical device such as a lithium secondary battery and an electrochemical device having the same. More particularly, the present invention relates to a separator in which a porous coating layer made of a mixture of a binder polymer and inorganic particles is formed on the surface of a porous substrate, and an electrochemical device containing the same.

BACKGROUND ART

Recently, there has been an increasing interest in energy storage technology. Batteries have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, in the development of such batteries, designs of new electrodes and batteries to improve capacity density and specific energy are mainly studied.

Among currently used secondary batteries, lithium secondary batteries developed in early 1990's have a higher drive voltage and a much higher energy density than those of conventional batteries using a liquid electrolyte solution such as Ni-MH batteries, Ni—Cd batteries, and $H_2SO_4$—Pb batteries. For these reasons, the lithium secondary batteries have been advantageously used. However, such a lithium secondary battery has disadvantages in that organic electrolytes used therein may cause safety-related problems such as ignition and explosion of the batteries and that processes for manufacturing such a battery are complicated. Recently, lithium-ion polymer batteries have been considered as one of the next-generation batteries since the above disadvantages of the lithium ion batteries are solved. However, the lithium-ion polymer batteries have a relatively lower battery capacity in comparison to the lithium ion batteries, and its discharging capacity is insufficient at low temperature. Thus, it is urgent to solve these disadvantages of the lithium-ion polymer batteries.

Such electrochemical devices have been produced from many companies, and battery safety characteristics are different in the electrochemical devices. Accordingly, it is important to evaluate and ensure the safety of the electrochemical batteries. First of all, malfunction of the electrochemical device should not cause any damage to users. For this purpose, the Safety Regulation strictly regulates ignition and explosion in the electrochemical devices. In the safety characteristics of the electrochemical device, overheating of the electrochemical device may cause thermal runaway, and explosion may occur when a separator is pierced. In particular, a polyolefin-based porous substrate commonly used as a separator of an electrochemical device shows extreme thermal shrinking behavior at a temperature of 100° C. or above due to its inherent characteristics and its manufacturing processes such as elongation, which may cause an electric short circuit between positive and negative electrodes.

Figure 1:
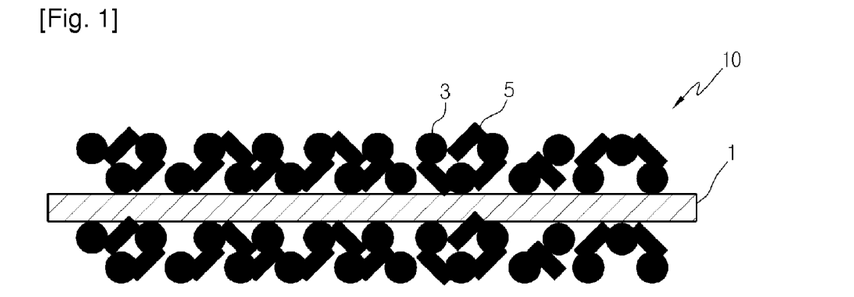
FIG. 1 is a sectional view schematically showing a separator.

In order to solve the above safety-related problems of the electrochemical device, Korean Patent Registration No. 10-0727248 and No. 10-0727247 disclose a separator 10 having a porous coating layer formed by coating at least one surface of a porous substrate 1 having many pores with a mixture of inorganic particles 3 and a binder polymer 5 (see FIG. 1). In the separator, the inorganic particles 3 in the porous coating layer formed on the porous substrate 1 serve as a kind of spacer that keeps a physical shape of the porous coating layer, so the inorganic particles 3 restrain thermal shrinkage of the porous substrate when the electrochemical device is overheated. In addition, interstitial volumes exist among the inorganic particles, thereby forming micro pores.

As mentioned above, the porous coating layer formed on the porous substrate contributes to the improvement of safety. However, due to the introduction of inorganic particles, the life span of an electrochemical device, particularly a high temperature cycle or storage life, may be deteriorated. The above documents disclose various kinds of binder polymers and their combinations, but they do not specifically disclose any binder polymer combination solving the above problem.

Meanwhile, the inorganic particles of the porous coating layer may be disintercalated due to the stress occurring during the assembling process of an electrochemical device such as a winding process. The disintercalated inorganic particles act as a local defect of the electrochemical device, thereby giving a bad influence on the safety of the electrochemical device. Thus, more endeavors for solving this problem are demanded.

DISCLOSURE OF INVENTION

Technical Problem

The present invention is designed to solve the problems of the prior art, and therefore an object of the invention is to provide a separator capable of improving life span characteristics of electrochemical devices by introducing a porous coating layer with inorganic particles, and an electrochemical device containing such a separator.

Another object of the present invention is to provide a separator capable of improving safety of an electrochemical device by solving the problem that inorganic particles in a porous coating layer formed on a porous substrate are disintercalated during an assembling process of the electrochemical device, and an electrochemical device containing such a separator.

Technical Solution

In order to accomplish the first object, the present invention provides a separator, which includes a porous substrate having a plurality of pores; and a porous coating layer formed on at least one surface of the porous substrate and made of a mixture of a plurality of inorganic particles and a binder polymer, wherein the binder polymer includes a first polyvinylidene fluoride-based copolymer having solubility of 25 weight % or more with respect to acetone at 35° C.; a second polyvinylidene fluoride-based copolymer having solubility of 10 weight % or less with respect to acetone at 35° C.; and a polymer having a cyano group.

In the separator of the present invention, the first polyvinylidene fluoride-based copolymer may be polyvinylidene fluoride-co-hexafluoropropylene, and the second polyvinylidene fluoride-based copolymer may be polyvinylidene fluoride-co-chlorotrifluoroethylene. Also, the polymer having a cyano group may be cyanoethylpullulan, cyanoethylpolyvinylalcohol, cyanoethylcellulose, cyanoethylsucrose, and so on.

In the separator of the present invention, it is preferred that, based on the entire weight of the porous coating layer, the content of the first polyvinylidene fluoride-based copolymer is 5 to 30 weight %, the content of the second polyvinylidene fluoride-based copolymer is 1 to 10 weight %, and the content of the polymer having a cyano group is 0.1 to 5 weight %, respectively.

The separator of the present invention may be interposed between positive and negative electrodes and used for electrochemical devices such as lithium secondary batteries and super capacitors.

Advantageous Effects

The separator according to the present invention solves deterioration of life span characteristics of an electrochemical device by adopting a porous coating layer with inorganic particles, and also solves the problem of disintercalation of inorganic particles in the porous coating layer formed on a porous substrate during an assembling process of the electrochemical device, thereby improving safety of the electrochemical device.

Accordingly, the separator of the present invention is very useful for electrochemical devices such as lithium secondary batteries and super capacitors, particularly middle or large batteries for electric vehicles or hybrid vehicles.

BRIEF DESCRIPTION OF DRAWINGS

Other objects and aspects of the present invention will become apparent from the following description of embodiments with reference to the accompanying drawing in which.

BEST MODE FOR CARRYING OUT THE INVENTION

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

A separator of the present invention includes a porous substrate having a plurality of pores; and a porous coating layer formed on at least one surface of the porous substrate and made of a mixture of a plurality of inorganic particles and a binder polymer. The binder polymer includes a first polyvinylidene fluoride-based copolymer having solubility of 25 weight % or more with respect to acetone at 35° C.; a second polyvinylidene fluoride-based copolymer having solubility of 10 weight % or less with respect to acetone at 35° C.; and a polymer having a cyano group.

As mentioned above, the introduction of inorganic particles into a porous coating layer formed on a porous substrate may cause deterioration of life span characteristics of an electrochemical device. The inventors found that, when a porous coating layer is formed using the three-component polymers at the same time, inorganic particles of the formed coating layer are minimally exposed to the separator surface due to phase separation, which accordingly allows improvement of life span characteristics of an electrochemical device and also solves the problem of disintercalating of inorganic particles. The present invention is conceived on the ground of the above.

In the separator of the present invention, the first and second polyvinylidene fluoride-based copolymers essentially contain a vinylidene fluoride component, and they have solubility of 25 weight % or more and 10 weight % or less, respectively. If polyvinylidene fluoride-based components with different solubility to a solvent used in forming a porous coating layer are used in mixture, polymers are phase-separated, thereby forming a porous coating layer of which inorganic particles are minimally exposed to a separator surface. The second polyvinylidene fluoride-based copolymer has a low solubility to acetone, so it is solidified in advance while the porous coating layer is formed, so the second polyvinylidene fluoride-based copolymer is generally positioned in a lower portion of the porous coating layer. On the contrary, the first polyvinylidene fluoride-based copolymer has a high solubility to acetone, so it is solidified more slowly and generally located in an upper portion of the porous coating layer. If the first polyvinylidene fluoride-based copolymer has solubility less than 25 weight % with respect to acetone at 35° C. or the second polyvinylidene fluoride-based copolymer has solubility more than 10 weight % with respect to acetone at 35° C., the mentioned polymer phase separation may not occur, so the above effects may not be realized. The first and second polyvinylidene fluoride-based copolymers may be polyvinylidene fluoride-co-hexafluoropropylene and polyvinylidene fluoride-co-chlorotrifluoroethylene, respectively. Mole ratios of hexafluoropropylene and chlorotrifluoroethylene may be 10 to 30 mole % and 5 to 30 mol %, respectively, but not limitedly.

In addition, in the separator of the present invention, the polymer having a cyano group plays a role of preventing inorganic particles of the porous coating layer from cohering with each other. The polymer having a cyano group may use cyanoethylpullulan, cyanoethylpolyvinylalcohol, cyanoethylcellulose and cyanoethylsucrose, in single or in mixture, but not limitedly.

In the separator of the present invention, based on the entire weight of the porous coating layer, the content of the first polyvinylidene fluoride-based copolymer is preferably 5 to 30 weight %, the content of the second polyvinylidene fluoride-based copolymer is preferably 1 to 10 weight %, and the content of the polymer having a cyano group is preferably 0.1 to 5 weight %. Also, it is apparent to those having ordinary skill in the art that any other polymer may be further mixed thereto if the effects of the present invention are not deteriorated.

In the separator of the present invention, the inorganic particles used for forming a porous coating layer serve as a kind of spacer that keeps a physical shape of the porous coating layer, so the inorganic particles restrain thermal shrinkage of the porous substrate when the electrochemical device is overheated. In addition, interstitial volumes exist among the inorganic particles, thereby forming micro pores. The inorganic particles are not specially limited if they are electrically and chemically stable. In other words, inorganic particles causing no oxidation or reduction reaction in an operating voltage range (for example, 0 to 5V based on Li/Li$^+$) of an electrochemical device may be used in the present invention. In particular, in case an inorganic particle with ion transferring capability is used, it is possible to enhance the performance of the electrochemical device by increasing ion conductivity.

In addition, in case an inorganic particle with a high dielectric constant is used, it contributes to the increase of dissociation of electrolyte salt, for example lithium salt, in the liquid electrolyte, thereby improving ion conductivity of the electrolyte.

Due to the above reasons, it is preferred that the inorganic particles may include inorganic particles having a dielectric constant of 5 or above, preferably 10 or above, inorganic particles having lithium-ion transferring capability, or their mixtures. The inorganic particle having a dielectric constant of 5 or above may be for example $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$, and their mixtures, but not limitedly.

In particular, the inorganic particles such as of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT) and hafnia ($HfO_2$) show a high dielectric constant of 100 or above and have piezoelectricity since charges are generated to make a potential difference between both surfaces when a certain pressure is applied thereto to extend or shrink them, so the above inorganic particles may prevent generation of an internal short circuit of both electrodes caused by an external impact and thus further improve the safety of the electrochemical device. In addition, in case the inorganic particles having a high dielectric constant are mixed with the inorganic particles having lithium ion transferring capability, their synergistic effect may be doubled.

In the present invention, the inorganic particle having lithium ion transferring capability means an inorganic particle containing lithium atom and having a function of moving a lithium ion without storing the lithium. The inorganic particle having lithium ion transferring capability may transfer and move lithium ions due to a kind of defect existing in the particle structure, so it is possible to improve lithium ion conductivity in the battery and also improve the performance of the battery. The inorganic particle having lithium ion transferring capability may be lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$ type glass (0<x<4, 0<y<13) such as $14Li_2O$-$9Al_2O_3$-$38TiO_2$-$39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5) such as $Li_{3.25}Ge_{0.25}P_{0.75}S_4$, lithium nitrides ($Li_xN_y$, 0<x<4, 0<y<2) such as $Li_3N$, $SiS_2$ type glass ($Li_xSi_yS_z$, 0<x<3, 0<y<2, 0<z<4) such as $Li_3PO_4$—$Li_2S$—$SiS_2$, $P_2S_5$ type glass ($Li_xP_yS_z$, 0<x<3, 0<y<3, 0<z<7) such as LiI—$Li_2S$—$P_2S_5$, or their mixtures, but not limitedly.

In the separator according to the present invention, the size of inorganic particles in the porous coating layer is not specially limited, but the particle size is preferably 0.001 to 10 μm in order to form a coating layer with a uniform thickness and ensure suitable porosity. If the particle size is less than 0.001 μm, a dispersing property of inorganic particles may be deteriorated, so it is not easy to control properties of the separator. If the particle size exceeds 10 μm, the thickness of the porous coating layer is increased, which may deteriorate mechanical properties. Also, an excessively great pore size may increase the possibility of internal short circuit while a battery is charged or discharged.

A ratio of the inorganic particles to the binder polymer in the porous coating layer formed in the separator according to the present invention is preferably 50:50 to 99:1, more preferably from 70:30 to 95:5. If the ratio of the inorganic particles to the binder polymer is less than 50:50, the content of polymer is so great that the thermal stability of the separator may be not much improved. In addition, pore size and porosity may be decreased due to the reduction of interstitial volume formed among the inorganic particles, thereby deteriorating the performance of a final battery. If the content of inorganic particles exceeds 99 parts by weight, the peeling resistance of the porous coating layer may be weakened since the content of binder polymer is so small. The thickness of the porous coating layer composed of the inorganic particles and the binder polymer is not specially limited but is preferably 0.01 to 20 μm. Also, pore size and porosity are not specially limited, but the pore size is preferably 0.001 to 10 μm and the porosity is preferably 10 to 90%. The pore size and porosity are mainly dependent on the size of inorganic particles. For example, in case inorganic particles have a diameter of 1 μm or less, the formed pores are also approximately 1 μm or less. The pores as mentioned above are filled with electrolyte injected later, and the filled electrolyte plays a role of transferring ions. In case the pore size and porosity are respectively less than 0.001 μm and 10%, the porous coating layer may act as a resistance layer. In case the pore size and porosity are respectively greater than 10 μm and 90%, mechanical properties may be deteriorated.

The separator of the present invention may further include other additives in addition to the inorganic particles and the binder polymer explained above as components of the porous coating layer.

In addition, in the separator of the present invention, the porous substrate having a plurality of pores may use any porous substrate, such as a polyolefin-based porous substrate, commonly used for electrochemical devices. The polyolefin-based porous substrate may adopt any polyolefin-based porous substrate commonly used as a separator of electrochemical devices, particularly lithium secondary batteries. For example, the polyolefin-based porous substrate may be a membrane or a non-woven fabric formed using any polyolefin-based polymer such as polyethylene like HDPE (high density polyethylene), LDPE (low density polyethylene), LLDPE (linear low density polyethylene and UHMWPE (ultra high molecular weight polyethylene), polypropylene, polybutylene and polypentene, or their mixtures. Thickness of the porous substrate is not specially limited, but preferably 5 to 50 μm. Pore size and porosity of the porous substrate are also not specially limited, but preferably 0.01 to 50 μm and 10 to 95%, respectively.

The separator having a porous coating layer with electrode active particles according to the present invention may be manufactured in a common way, and a preferable example is explained below, but the present invention is not limited thereto.

First, the above-mentioned three-component polymer is dissolved in a solvent to make a binder polymer solution.

Subsequently, inorganic particles are added to the binder polymer solution and dispersed therein. The solvent preferably has a low boiling point. It will help uniform mixture and easy removal of the solvent afterward. Non-limiting examples of usable solvents include acetone, tetrahydrofuran, methylene chloride, chloroform, dimethylformamide, N-methyl-2-pyrrolidone (NMP), cyclohexane, and water, or their mixtures. Among them, acetone is most preferred. The inorganic particles are preferably pulverized after being added to the binder polymer solution. At this time, the time required for pulverization is suitably 1 to 20 hours, and the particle size of the pulverized particles is preferably 0.001 and 10 μm, as mentioned above. Conventional pulverization methods may be used, and ball milling is particularly preferred.

After that, a porous substrate is coated with the binder polymer solution in which the inorganic particles are dispersed, under the humidity condition of 10 to 80%, and then dried.

In order to coat the porous substrate with the binder polymer solution in which the inorganic particles are dispersed, common coating methods well known in the art may be used. For example, various methods such as dip coating, die coating, roll coating, comma coating or their combinations may be used. In addition, the porous coating layer may be formed on both surfaces of the porous substrate or on any one surface thereof selectively.

The separator prepared as mentioned above according to the present invention may be used for an electrochemical device. In other words, the separator of the present invention may be useful as a separator interposed between positive and negative electrodes. At this time, in case a polymer that is gellable at swelling in liquid electrolyte is used as a binder polymer component, after a battery is assembled using the separator, the injected electrolyte and the binder polymer may be reacted and then gelated to form a gel-type organic/inorganic composite electrolyte.

The electrochemical device may be any device in which electrochemical reactions may occur, and specific examples of the electrochemical devices include all kinds of primary batteries, secondary batteries, fuel cells, solar cells or capacitors such as a super capacitor. In particular, among the secondary batteries, lithium secondary batteries such as a lithium metal secondary battery, a lithium ion secondary battery, a lithium polymer secondary battery or a lithium ion polymer secondary battery are preferred.

The electrochemical device may be made according to common methods well known in the art. For example, the electrochemical device may be made by interposing the above separator between positive and negative electrodes, and then injecting an electrolyte therein.

There is no special limitation in electrodes that may be used together with the separator of the present invention, and the electrode may be manufactured in a form that electrode active materials are united to electrode current collectors according to one of common methods well known in the art. Among the electrode active materials, positive electrode active material may adopt common positive electrode active material available for a positive electrode of conventional electrochemical devices. Particularly, the positive electrode active material preferably uses lithium manganese oxides, lithium cobalt oxides, lithium nickel oxides, lithium iron oxides or lithium composite oxides thereof, not limitedly. Also, non-limiting examples of negative electrode active materials are lithium intercalation materials such as lithium metal, lithium alloy, carbon, petroleum coke, activated carbon, graphite or other carbonaceous materials. Non-limiting examples of the positive electrode current collector include a foil made of aluminum, nickel or combinations thereof, and non-limiting examples of the negative electrode current collector include a foil made of copper, gold, nickel, copper alloys or combinations thereof.

The electrolyte solution useable in the present invention includes a salt represented by the formula of $A^+B^-$, wherein $A^+$ represents an alkali metal cation such as $Li^+$, $Na^+$, $K^+$ or their combinations, and $B^-$ represents an salt containing an anion such as $PF_6^-$, $BF_4^-$, $Cl^-$, $Br_-$, $I_-$, $ClO_4^-$, $AsF_6^-$, $CH_3CO_2^-$, $CF_3SO_3^-$, $N(CF_3SO_2)_2^-$, $C(CF_2SO_2)_3^-$ or their combinations. The salt may be dissolved or dissociated in an organic solvent composed of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone), or their mixtures. However, the electrolyte solution useable in the present invention is not limited to the above examples.

The electrolyte solution may be injected in a suitable step during the manufacturing process of a battery, according to the manufacturing process and desired properties of a final product. In other words, the electrolyte solution may be injected before a battery is assembled, during a final step of the assembly process of a battery, or the like.

To apply the separator of the present invention to a battery, a folding process and a laminating or stacking process of the separator and the electrode may be used in addition to a general winding process. The separator of the present invention has excellent peeling resistance, so inorganic particles are not easily disintercalated during the battery assembling processes.

MODE FOR THE INVENTION

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

Embodiment 1

Polyvinylidene fluoride-co-hexafluoropropylene (containing 18 mol % of hexafluoropropylene having solubility of 40 weight % or more with respect to acetone at 35° C., polyvinylidene fluoride-co-chlorotrifluoroethylene (containing 20 mol % of chlorotrifluoroethylene) having solubility of 5 weight % or less with respect to acetone at 35° C., and cyanoethylpullulan were respectively added at a weight ratio of 8:2:2 to acetone and dissolved at 50° C. for about 12 hours to make a binder polymer solution.

$Al_2O_3$ powder and $BaTiO_3$ powder mixed at a weight ratio of 9:1 were added to the prepared binder polymer solution such that a weight ratio of binder polymer/inorganic particles=10/90, and then it was pulverized and dispersed for 12 hours or more by ball milling to make a slurry. The prepared slurry was applied to a polyethylene/polypropylene/polyethylene porous membrane and then dried. The coating thickness was controlled to be about 5 μm in its section.

Comparative Example 1

The comparative example 1 was identical to the embodiment 1, except that inorganic particle was not added, and only the polyvinylidene fluoride-co-chlorotrifluoroethylene binder of the embodiment 1 was used as the binder polymer for coating with a thickness of about 1 to μm in section. The separator coated with only the polyvinylidene fluoride-co-chlorotrifluoroethylene binder exhibits excellent high temperature characteristics in a cell, so it is useful as a comparative example.

Comparative Example 2

The comparative example 2 was identical to the embodiment 1, except that polyvinylidene fluoride-co-chlorotrifluoroethylene and cyanoethylpullulan of the embodiment 1 were used at a weight ratio of 10:2, respectively.

Comparative Example 3

The comparative example 3 was identical to the embodiment 1, except that polyvinylidene fluoride-co-hexafluoropropylene and cyanoethylpullulan of the embodiment 1 were used at a weight ratio of 10:2, respectively.

Figure 2:
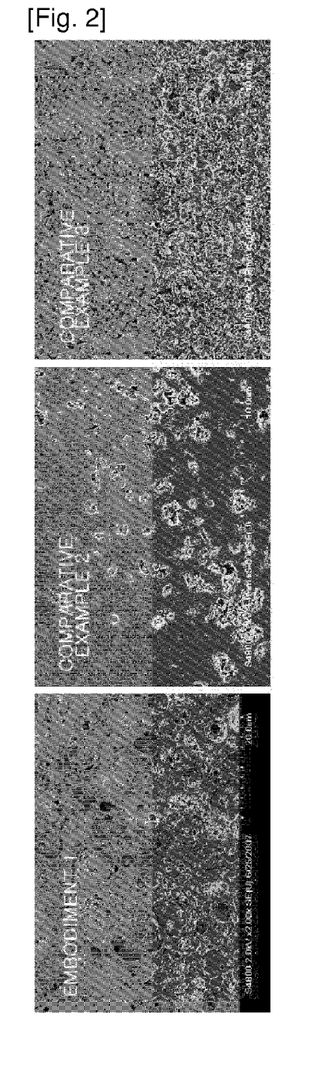
FIG. 2 is a SEM (Scanning Electron Microscope) photograph showing surfaces of separators prepared according to an embodiment and comparative examples.

Surfaces of the separators prepared according to the embodiment 1 and the comparative examples 2 and 3 were photographed using SEM (Scanning Electron Microscope), as depicted in FIG. 2.

Also, in order to evaluate peeling resistance of the porous coating layers of the separators prepared according to the embodiment and the comparative examples, the following evaluation was conducted. The term 'peeling force of a porous coating layer', used herein, means a peeling force measured according to the following test. The peeling force test was executed as follows. A separator sample was fixed on a glass plate using a double-sided adhesive tape, and then a tape (a 3M transparent tape) was firmly attached to the exposed porous coating layer. Subsequently, a tensile force measuring equipment was used to measure a force required for separating the tape, thereby evaluating a peeling force of the porous coating layer.

Meanwhile, surface adhesive strength was evaluated as follows. For measuring surface adhesive strength, two sheets of separators were put between PET films and then laminated. After that, a tensile strength measuring equipment was use to measure a force required for separating two laminated separators, thereby evaluating the surface adhesive strength of the porous coating layer. Measurement results for peeling force and surface adhesive strength of the embodiment 1 and the comparative examples 2 and 3 are listed in Table 1.

TABLE 1

| Ð | Peeling force of Porous coating layer (gf) | Surface adhesive strength (gf) |
|---|---|---|
| Embodiment 1 | 100 | 100 |
| Comparative example 2 | 12 | 10* Ð |
| Comparative example 3 | 25 | ~0 |

Meanwhile, the surface adhesive strength of the comparative example 2 was measured as being slightly over 10 since separation occurred between the porous substrate and the porous coating layer at measurement, but it is expected that an actual surface adhesive strength is much greater than 10 gf.

Preparation of Negative Electrode 96 weight % of carbon powder as a negative electrode active material, 3 weight % of polyvinylidene fluoride (PVdF) as a coupling agent and 1 weight % of carbon black as a conductive material were added to N-methyl-2 pyrrolidone (NMP) as a solvent to make a negative electrode mixture slurry. The negative electrode mixture slurry was applied to a copper (Cu) film that is a negative current collector with a thickness of 10 μm, and then dried to make a negative electrode, and then roll pressing was conducted thereto.

Preparation of Positive Electrode 90 weight % of lithium manganese composite oxide as a positive electrode active material, 6 weight % of carbon black as a conductive material and 4 weight % of PVdF as a coupling agent were added to N-methyl-2 pyrrolidone (NMP) as a solvent to make a positive electrode active material slurry. The positive electrode active material slurry was applied to an aluminum (Al) film that is a positive current collector with a thickness of 20 μm, and then dried to make a positive electrode, and then roll pressing was conducted thereto.

The above electrodes and separators were used to make cells. After that, high temperature (45° C.) cycle life and high temperature (60° C.) storage life of the cells were measured in the following way.

High Temperature (60° C.) Storage Life

Figure 3:
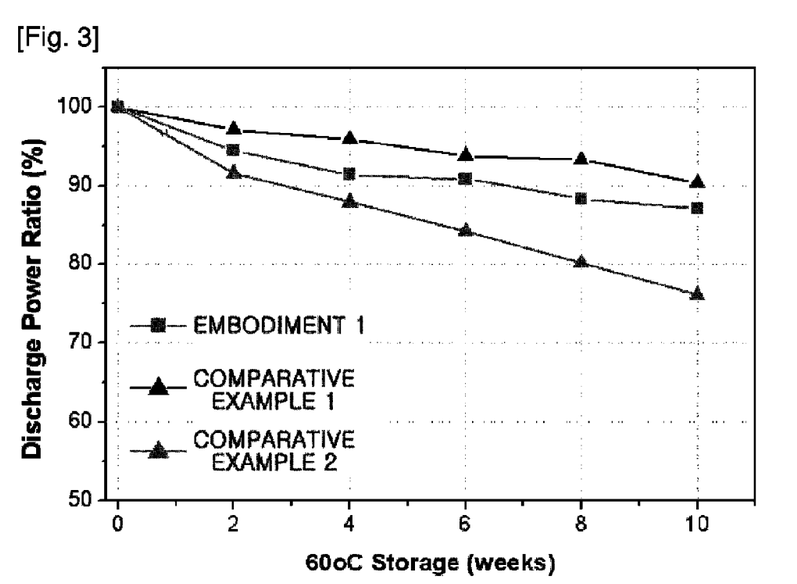
FIG. 3 is a graph showing measurement results of high-temperature storage life characteristics of the batteries according to the embodiment and the comparative examples.

The cells prepared according to the embodiment 1 and the comparative examples 1 and 2 were initially charged/discharged, and then the cells in SOC 50% state were stored in a 60° C. chamber and taken out to measure power variation at every two weeks at 25° C., SOC 50%. The measurement results are shown in FIG. 3.

High Temperature Cycle Life Characteristics

Figure 4:
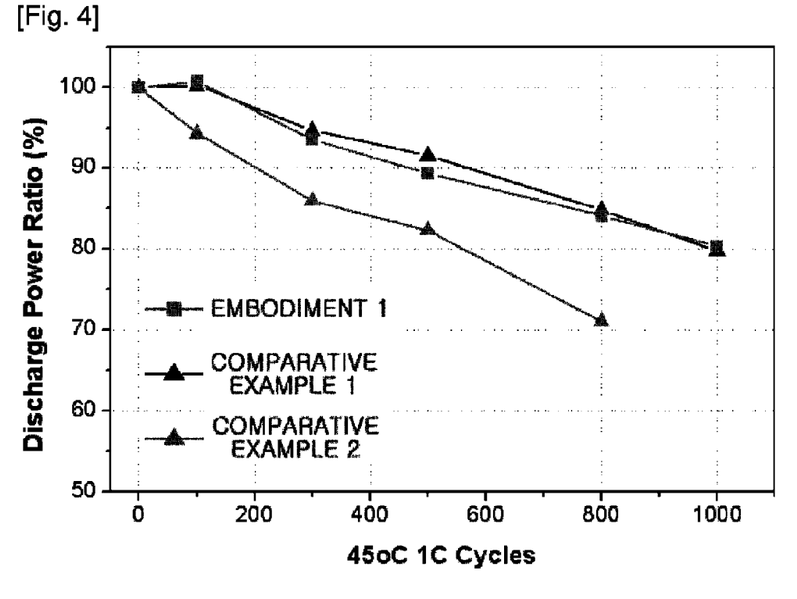
FIG. 4 is a graph showing measurement results of high-temperature cycle life characteristics of the batteries according to the embodiment and the comparative examples.

The cells prepared according to the embodiment 1 and the comparative examples 1 and 2 (each three cells) were initially charged/discharged, and basic charging/discharging at high temperature (45° C.) was conducted 1000 times at 1C. Power variation was measured at every 200 turns at 25° C., SOC 50%. The measurement results are shown in FIG. 4.

The invention claimed is:

1. A separator, comprising:
(A) a porous substrate having a plurality of pores; and
(B) a porous coating layer formed on at least one surface of the porous substrate to have a thickness of 0.01 to 20 μm and made of a mixture of a plurality of inorganic particles with a particle size of 0.001 to 10 μm and a binder polymer,
wherein a weight ratio of the inorganic particles to the binder polymer is 50:50 to 99:1,
wherein the binder polymer comprises:
(i) polyvinylidene fluoride-co-hexafluoropropylene which is a first polyvinylidene fluoride-based copolymer having solubility of 25 weight % or more with respect to acetone at 35° C.;
(ii) polyvinylidene fluoride-co-chlorotrifluoroethylene which is a second polyvinylidene fluoride-based copolymer having solubility of 10 weight % or less with respect to acetone at 35° C.; and
(iii) a polymer having a cyano group; and
wherein, based on the entire weight of the porous coating layer, the content of the first polyvinylidene fluoride-based copolymer is 5 to 30 weight %, the content of the second polyvinylidene fluoride-based copolymer is 1 to 10 weight %, and the content of the polymer having a cyano group is 0.1 to 5 weight %, respectively.

2. The separator according to claim 1,
wherein the polymer having a cyano group is at least one selected from the group consisting of cyanoethylpullulan, cyanoethylpolyvinylalcohol, cyanoethylcellulose, cyanoethylsucrose, and their mixtures.

3. The separator according to claim 1,
wherein the inorganic particles are selected from the group consisting of inorganic particles having a dielectric constant of 5 or above, inorganic particles having lithium-ion transferring capability, and their mixtures.

4. The separator according to claim 3,
wherein the inorganic particle having a dielectric constant of or above is an inorganic particle selected from the group consisting of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$, and their mixtures.

5. The separator according to claim 3,
wherein the inorganic particle having lithium ion transferring capability is an inorganic particle selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_xS_w$, $0<x<4$, $0<y<1$, $0<z<1$, $0<w<5$), lithium nitrides ($Li_xN_y$, $0<x<4$, $0<y<2$), $SiS_2$ ($Li_xSi_yS_z$, $0<x<3$, $0<y<2$, $0<z<4$) type glass, $P_2S_5$ ($Li_xP_yS_z$, $0<x<3$, $0<y<3$, $0<z<7$) type glass, and their mixtures.

6. The separator according to claim 1,
wherein the porous substrate is a polyolefin-based porous substrate.

7. The separator according to claim 6,
wherein the polyolefin-based porous substrate is made of any one polymer selected from the group consisting of polyethylene, polypropylene, polybutylene, polypentene, and their mixtures.

8. An electrochemical device, comprising a positive electrode, a negative electrode, and a separator interposed between the positive electrode and the negative electrode,
wherein the separator is a separator defined in claim 1.

9. The electrochemical device according to claim 8,
wherein the electrochemical device is a lithium secondary battery.

* * * * *

UNITED STATES PATENT AND TRADEMARK OFFICE
CERTIFICATE OF CORRECTION

PATENT NO. : 8,168,332 B2  Page 1 of 1
APPLICATION NO. : 12/745717
DATED : May 1, 2012
INVENTOR(S) : Bae et al.

It is certified that error appears in the above-identified patent and that said Letters Patent is hereby corrected as shown below:

On the Title Page, item [57] fifth to sixth line of ABSTRACT, "fluoride based" should read --fluoride-based--.

In the Specification
Column 1, line 53, "its" should read --their--.
Column 4, line 54, "30 mol%" should read --30 mole%--.
Column 8, line 45, "understandings" should read --understanding--.
Column 8, line 49, "understandings" should read --understanding--.
Column 9, line 49, delete "a".
Column 9, line 49, "use" should read --used--.

In the Claims
Column 11, line 13, Claim 4, after "of" insert --5--.

Signed and Sealed this
Twenty-fourth Day of December, 2013

Margaret A. Focarino
*Commissioner for Patents of the United States Patent and Trademark Office*